3,048,609
**SECONDARY AND TERTIARY BIS-POLYFLUORO-
ORGANIC MERCURY COMPOUNDS**
William T. Miller, Ithaca, N.Y., and William J. Middleton, Claymont, Del., assignors to E. I. du Pont de Nemours and Company, Wilmington, Del., a corporation of Delaware
No Drawing. Filed Nov. 12, 1958, Ser. No. 773,175
11 Claims. (Cl. 260—431)

This invention relates to a new class of fluorinated organic compounds.

Fluorine-bearing compounds possess unusual and unexpected properties which make the compounds valuable for applications in many fields. The properties which new fluorine-bearing compounds will have cannot be predicted readily from a knowledge of the properties of existing compounds. The technology of fluorine-bearing compounds has been studied intensively in recent years because of the many unpredictable but, nevertheless, valuable properties which new fluorine-bearing compounds possess.

Many investigations have been made on polyfluorohydrocarbons, that is, compounds which contain only carbon, fluorine and optionally hydrogen, but fluorinated organic compounds in which the carbon is bonded to a metal or to an element which is usually referred to as a metalloid have been studied only to a limited extent. An excellent summary of present knowledge of this type of fluorine-bearing compounds is given in Lovelace, Rausch and Postelnek, "Aliphatic Fluorine Compounds," Chapter XIII, pp. 307–329 (1958), Reinhold Publishing Corp., New York.

The known fluorine-bearing organometallics are characterized generally by having a metal or an element such as boron, silicon or arsenic, bonded to primary polyfluorohydrocarbon groups, that is, the metal is bonded to a terminal or alpha-carbon of the polyfluorohydrocarbon group. A number of these compounds have been described which are Grignard reagents, that is, magnesium derivatives in which one of the two valence bonds of magnesium is satisfied by a halogen, for example, iodine, and the other valence is satisfied by a polyfluorohydrocarbon group. The chemical and thermal instability of Grignard reagents is a well-known fact. Other known fluorine-bearing organo-metallics in which the metal is bonded to a primary carbon also have limited thermal and chemical stability. To illustrate, the known polyfluorohydrocarbon substituted mercurials in which the mercury is bonded to a primary carbon react with many metals and their alloys.

Heretofore, no fluorine-bearing organic compounds have been prepared which contain mercury bonded solely to secondary or tertiary polyfluorinated hydrocarbon groups. In other words, prior to our invention, no compounds were known in which mercury is bonded solely to carbons other than the terminal or alpha-carbon of the polyfluorinated hydrocarbon group.

We have recently discovered such a class of secondary and tertiary polyfluorohydrocarbyl organometallic compounds. The compounds of our invention can be defined more precisely as polyfluoroorganic mercury compounds in which the valences of said mercury are satisfied solely by singly bonded carbons, said carbons being otherwise bonded to at most one fluorine and at least two aliphatically saturated polyhalogenated hydrocarbon groups in which the alpha-carbons of said groups are bonded only to fluorine or carbon and in which any additional halogens are chlorine or fluorine, one of said polyhalogenated groups being trifluoromethyl.

The new compounds of the invention can also be defined by the structural formula

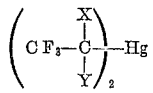

where X represents a polyhalogenated hydrocarbon group in which the alpha-carbon is bonded only to fluorine or carbon, any additional halogens in the group being chlorine or fluorine; Y is fluorine or a group as defined for X. The number of carbon atoms in each polyhalogenated hydrocarbon radical bonded to Hg cannot be less than 3 and preferably does not exceed 12.

An especially preferred group of compounds of the invention are polyfluoroorganic compounds containing mercury, the valences of said mercury being satisfied solely by singly bonded carbons which are otherwise bonded to at most one fluorine and at least two aliphatically saturated polyhalogenated hydrocarbon groups in which the alpha-carbons are bonded only to fluorine or carbon, one of said groups being trifluoromethyl and the remaining groups being composed only of carbon and fluorine and at most one hydrogen or chlorine and having at most 12 carbons. This group of compounds is preferred because they have excellent stability.

The compounds of this invention are solids or liquids which can be isolated in pure form. The compounds, if solids, are frequently low-melting. They can be stored for long periods of time at ordinary temperatures and pressures without significant decomposition. They differ greatly in this respect from compounds disclosed in the literature many of which must be stored at very low temperatures, generally in the range of —20° or below or which must be kept in cold solutions. The compounds of the invention are generally toxic and must, therefore, be handled with caution to prevent absorption through the skin or inhalation into the lungs.

The compounds of the invention can be prepared by methods which are described in the following paragraphs.

A polyfluoroolefin of at least 3 carbons and the inorganic fluoride, i.e., mercuric fluoride, are heated, preferably under pressure, in the presence of anhydrous hydrogen fluoride for a time sufficient to effect reaction. The polyfluoroolefin employed in the process may be represented structurally by the formula

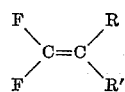

where R is fluorine or a group as defined for R' and R' is an aliphatically saturated polyhalogenated hydrocarbon group, the alpha-carbon in said polyhalogenated hydrocarbon group being bonded only to fluorine or carbon, any halogens other than fluorine in the groups being chlorine. Preferably the fluoroolefins contain at most 12 carbons.

Examples of fluoroolefins which are operable in the process are perfluoropropylene, perfluoro-1-butene, perfluoroisobutylene, 4H-heptafluoro-1-butene, 4-chloroheptafluoro-1-butene, perfluoro-1-dodecene, 12H-perfluoro-1-dodecene, 8-chloropentadecafluoro-1-octene, 1,1,2,3,3-pentafluoro-1-pentene, 1,1,2,3,3-pentafluoro-1-octene, 3-phenylpentafluoropropylene and 3-(p-tolyl)-pentafluoropropylene.

An especially preferred group of compounds for use in the above process are the polyfluoroolefins of 3–12 carbons which are composed solely of carbon and fluorine and at most one hydrogen or one chlorine, which hydrogen or chlorine, if present, is on the omega-carbon.

The molar ratio in which the fluoroolefin and the mercuric fluoride are used is not critical. For maximum yield of product it is desirable to use the fluoroolefin in excess. In a preferred mode of operation the molar ratio of fluoroolefin to inorganic fluoride is at least 2:1. It is not essential, however, for operability of the process that this ratio be employed.

In the operation of the process a reaction vessel is used which is capable of withstanding pressure and which is lined with a material resistant to attack by hydrogen fluoride. The vessel is preferably flushed with an inert gas, for example, nitrogen, to remove air and traces of moisture. Flushing with the inert gas is, however, not essential for operability of the process. The vessel is then chilled to 0° C. or lower and is charged with the inorganic fluoride (or its precursor, the oxide), liquid hydrogen fluoride and the fluoroolefin. The reaction vessel is then sealed and heated under autogenous pressure with suitable mechanical agitation, for example, by shaking or stirring. The temperature at which the reaction is conducted will generally lie between about 50° and 300° C. Generally the reaction will proceed satisfactorily at a temperature of about 75° to 200° C. and this temperature range is, therefore, preferred. The time of the reaction is determined to some extent by the temperature at which it is conducted. The time will generally lie between about 4 hours and 48 hours; 8 to 36 hours is normally sufficient. The pressure, as stated before, is autogenous and generally lies between about 2 atmospheres and 200 atmospheres or even higher. Pressure is employed only to keep the reactants in contact with each other and excessive pressures are, therefore, not essential.

The following examples illustrate the compounds of the invention and the methods for preparing them. Quantities are given as parts by weight.

*Example I*

(*A*) A pressure vessel (capacity, 1000 parts of water) lined with a corrosion-resistant steel, is flushed with nitrogen and cooled in a solid carbon dioxide-acetone mixture. The pressure vessel is charged with 180 parts of mercuric fluoride, 225 parts of hexafluoropropylene and 148 parts of liquid hydrogen fluoride. The molar ratio of mercuric fluoride to hexafluoropropylene is 1:2. The pressure vessel is closed and heated under autogenous pressure for 12 hours at 100° C. with mechanical agitation. The reaction vessel is cooled and the gaseous products are vented into a cooled receiver. The liquid residue in the reaction vessel is filtered and the filtrate is distilled in an efficient fractionating column. There is obtained 248 parts of bis(heptafluoro-2-propyl)mercury, a colorless liquid, boiling at 116–117° C.; $n_D^{24}$ 1.3240.

*Analysis.*—Calc'd for $C_6F_{14}Hg$: F, 49.38; Hg, 37.24. Found: F, 48.74; Hg, 37.13.

(*B*) A pressure vessel (capacity, 400 parts of water), which is lined with a corrosion-resistant steel, is charged as described in part A with 100 parts of mercuric fluoride, 150 parts of hexafluoropropylene and about 98 parts of liquid hydrogen fluoride. The reaction mixture is heated at 180° C. for 12 hours. There is obtained about 94 parts of bis(heptafluoro-2-propyl)mercury which is purified by distillation in an efficient fractionating column. The identity of the compound is confirmed by its nuclear magnetic resonance spectrum.

(*C*) A reaction mixture, prepared as described in part A, employing 100 parts of mercuric fluoride, 150 parts of hexafluoropropylene and about 98 parts of liquid hydrogen fluoride, is heated at 150° C. for 12 hours. There is obtained 74.5 parts of bis(heptafluoro-2-propyl) mercury, boiling point 116–117° C.; M.P. 21° C.; $n_D^{25}$ 1.3244.

*Analysis.*—Calc'd for $C_6F_{14}Hg$: Hg, 37.24. Found: Hg, 36.90.

(*D*) A pressure vessel, similar to the vessel described in part B, is charged with 120 parts of mercuric fluoride, 150 parts of hexafluoropropylene and about 98 parts of liquid hydrogen fluoride. The reaction mixture is heated for 12 hours at 100° C. There is obtained 144 parts of bis(heptafluoro-2-propyl)mercury. A solid unidentified product (5.4 parts), which melts at 77–78° C. and boils at 180° C., is also obtained.

*Example II*

Using the procedure described in Example I, a mixture of 72 parts of mercuric fluoride, 100 parts of 4H-heptafluoro-1-butene and 100 parts of hydrogen fluoride is heated for 12 hours at 120° C. Hydrogen fluoride is removed from the crude reaction product by evaporation or distillation with observance of suitable precautions in view of the known corrosive characteristics of hydrogen fluoride. The liquid product remaining after removal of the hydrogen fluoride is washed with dilute (about 10% strength) aqueous sodium bicarbonate solution. The liquid residue is dried over calcium chloride and distilled through an efficient fractionating column. There is obtained 120 parts of bis(4H-octafluoro-2-butyl)-mercury a colorless liquid boiling at 172.5–173° C.

*Analysis.*—Calc'd for $C_8H_2F_{16}Hg$: Hg, 33.3; F, 50.3. Found: Hg, 32.5; F, 49.4.

*Example III*

Using the procedure described in Example I, a mixture of 56 parts of 4-chloroheptafluoro-1-butene, 36 parts of mercuric fluoride and 100 parts of hydrogen fluoride is heated for 12 hours at 120° C. The liquid reaction product, which remains after cooling and venting the reaction vessel, is distilled through an efficient fractionating column under reduced pressure. There is obtained 7.0 parts of bis-(4-chlorooctafluoro-2-butyl)mercury, a colorless liquid which boils at 85–87° C. at 20 mm. pressure and at 185° C. at atmospheric pressure. The density of the liquid is 2.42.

*Analysis.*—Calc'd for $C_8Cl_2F_{16}Hg$: Cl, 10.5; Hg, 30.0. Found: Cl, 10.5; Hg, 30.4.

Examples I–III illustrate the preparation of the compounds of the invention from an inorganic fluoride and a fluoroolefin in anhydrous hydrogen fluoride. As stated earlier, the inorganic oxide, HgO, can be used in place of the inorganic fluoride ($HgF_2$). To illustrate, bis(6H-dodecafluoro-2-hexyl)mercury is prepared by heating mercuric oxide and 6H-undecafluoro-1-hexene in anhydrous hydrogen fluoride under the conditions described in the preceding examples.

Other compounds which are prepared by this process are bis(perfluoro-2-dodecyl)mercury, bis(perfluoro-tert.-butyl)mercury, bis(perfluoro-2-isobutyl)mercury from perfluoroisobutylene and mercury fluoride and bis(12H-perfluoro-2-dodecyl)mercury from 12H-perfluoro-1-dodecene and mercury fluoride.

The compounds of this invention possess unusual chemical and thermal stabilities as illustrated in the following paragraphs:

(*a*) The mercurial obtained from hexafluoropropene, i.e., bis(heptafluoro-2-propyl)mercury, does not react with magnesium amalgam in ether as a reaction medium. In contrast, a primary perfluoroalkyl mercurial, bis(pentafluoroethyl)mercury, reacts vigorously and exothermically with magnesium amalgam under the same conditions.

(*b*) Bis(heptafluoro-2-propyl)mercury reacts appreciably with iodine only if heated under pressure at about 200° C. or higher for a period of about 8 hours. In contrast, a primary perfluoroalkyl mercurial, bis(trifluoromethyl)mercury reacts with iodine after 1 hour at 100° C. and 15 minutes at 150° C.

(*c*) Bis(heptafluoro-2-propyl)mercury is unchanged after heating in a sealed glass tube at 270° C. for 15 minutes and 300° C. for 20 minutes. In contrast, bis(trifluoromethyl)mercury is reported to decompose when heated above about 170° C. (Emeleus and Haszeldine, J. Chem. Soc., 1949, 2953).

In view of the unusual chemical and thermal stabilities shown by the compounds, they are useful in many industrial applications. They are miscible with many organic solvents, including saturated hydrocarbons and gasoline. They are valuable as power transmission liquids and for use in transducers. They are valuable for use in gear boxes, automatic transmissions and inertial guidance instruments. The mercurials are solvents for nylons and for cellulose acetate. To illustrate, a commercial nylon obtained from hexamethylenediamine and adipic acid and a commercial cellulose acetate dissolved in bis(perfluoro-2-propyl)mercury to form clear solutions from which films are obtained by conventional methods.

The compounds of the invention are stable in contact with metal surfaces such as iron, steel, stainless steel, nickel and copper and can therefore be employed in applications which involve prolonged contact with these metals.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which as exclusive property or privilege is claimed are defined as follows:

1. Bis-polyfluoroorganic mercury compounds in which the valences of said mercury are satisfied solely by two singly bonded carbon atoms, said carbon atoms being otherwise bonded to at most one fluorine, at least one trifluoromethyl group and at least one open chain saturated polyhalogenated hydrocarbon group in which the alpha-carbon of said hydrocarbon group is bonded only to a member selected from the group consisting of carbon and fluorine, any additional halogens are members selected from the group consisting of fluorine and chlorine, and each of said two carbon atoms and their respective substituents totalling from 3 to 12 carbon atoms.

2. Polyfluoroorganic compounds having the formula

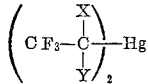

where X represents an open-chain saturated polyfluoropolyhalogenated hydrocarbon group in which the alpha-carbon is bonded only to a member selected from the group consisting of carbon and fluorine, the halogens in said groups being members selected from the group consisting of fluorine and chlorine; Y is a member selected from the group consisting of fluorine and X, as heretofore defined; and wherein each polyhalogenated hydrocarbon radical bonded to mercury contains from 3 to 12 carbon atoms.

3. The compounds of claim 2 wherein X and Y together contain at most one member selected from the group consisting of hydrogen and chlorine.

4. A process of preparing the polyfluoroorganic mercury compounds of claim 1 which comprises heating together, at reaction temperature in the presence of anhydrous hydrogen fluoride, a compound selected from the group consisting of mercuric fluoride and mercuric oxide, and a polyfluoromonoolefin of from 3 to 12 carbon atoms having the formula

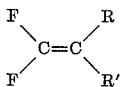

wherein R is a member selected from the group consisting of fluorine and R'; and R' is an aliphatically saturated polyhalogenated hydrocarbon group, the alpha-carbon of which is bonded only to a member selected from the group consisting of fluorine and carbon, any halogens other than fluorine being chlorine.

5. A process of preparing bis(heptafluoro-2-propyl)-mercury which comprises heating together hexafluoropropylene and mercuric fluoride at reaction temperature in the presence of anhydrous hydrogen fluoride.

6. A process of preparing bis(4H-octafluoro-2-butyl)-mercury which comprises heating together 4H-heptafluoro-1-butene and mercuric fluoride at reaction temperature in the presence of anhydrous hydrogen fluoride.

7. A process of preparing bis(4-chlorooctafluoro-2-butyl)mercury which comprises heating together 4-chloroheptafluoro-1-butene and mercuric fluoride at reaction temperature in the presence of anhydrous hydrogen fluoride.

8. A process of preparing bis(6H-dodecafluoro-2-hexyl)mercury which comprises heating together 6H-undecafluoro-1-hexene and mercuric oxide at reaction temperature in the presence of anhydrous hydrogen fluoride.

9. Bis(heptafluoro-2-propyl)mercury.
10. Bis(4H-octafluoro-2-butyl)mercury.
11. Bis(4-chlorooctafluoro-2-butyl)mercury.

References Cited in the file of this patent

UNITED STATES PATENTS 2,844,614     Krespan _____ July 22, 1958

OTHER REFERENCES

J. Chem. Soc., November 1949, pages 2948 to 2952.
J. Chem. Soc., August 1954, pages 2979 to 2986.